(12) United States Patent
Varga

(10) Patent No.: US 9,488,442 B2
(45) Date of Patent: Nov. 8, 2016

(54) ANTI-SNIPER TARGETING AND DETECTION SYSTEM

(71) Applicant: Kenneth Varga, Peoria, AZ (US)

(72) Inventor: Kenneth Varga, Peoria, AZ (US)

(73) Assignee: Real Time Companies, LLC, Phoenix, AZ (US)

( * ) Notice: Subject to any disclaimer, the term of this patent is extended or adjusted under 35 U.S.C. 154(b) by 0 days.

(21) Appl. No.: 14/660,661

(22) Filed: Mar. 17, 2015

(65) Prior Publication Data

US 2015/0345907 A1    Dec. 3, 2015

Related U.S. Application Data

(63) Continuation-in-part of application No. 13/385,040, filed on Jan. 30, 2012, now abandoned.

(60) Provisional application No. 61/626,702, filed on Sep. 30, 2011, provisional application No. 61/575,131, filed on Aug. 16, 2011, provisional application No. 61/626,701, filed on Sep. 30, 2011, provisional application No. 61/571,113, filed on Jun. 20, 2011.

(51) Int. Cl.
| | |
|---|---|
| *G06G 7/80* | (2006.01) |
| *F41G 3/14* | (2006.01) |
| *G01S 3/784* | (2006.01) |
| *G01S 3/808* | (2006.01) |
| *G01S 13/86* | (2006.01) |
| *G01S 17/02* | (2006.01) |

(52) U.S. Cl.
CPC .............. *F41G 3/147* (2013.01); *G01S 3/784* (2013.01); *G01S 3/8083* (2013.01); *G01S 13/867* (2013.01); *G01S 3/8086* (2013.01); *G01S 17/023* (2013.01)

(58) Field of Classification Search
CPC .... F41G 3/147; G01S 13/867; G01S 17/023; G01S 3/784; G01S 3/8083; G01S 3/8086
USPC .................................. 235/400, 404, 405, 408
See application file for complete search history.

(56) References Cited

U.S. PATENT DOCUMENTS

| | | | |
|---|---|---|---|
| 7,283,658 B2 * | 10/2007 | Maruya | G06T 7/0065 345/427 |
| 2013/0192451 A1 * | 8/2013 | Scott | F41G 3/147 89/41.05 |

* cited by examiner

*Primary Examiner* — Seung Lee
(74) *Attorney, Agent, or Firm* — Polsinelli PC

(57) ABSTRACT

An anti-sniper targeting system where a spherical omni-directional depth stereoscopic multi-lens camera, a radar (e.g., LIDAR), and microphone identify, detect, and determine target positions and bearings, detect target weapon flash, detect glint, track bullet trajectory, coordinate, track, share, and assign targets. Target bearings and ranges are determined by sound and heat signature detection from an infrared camera, from glint, and radar to rapidly position a fire control arm with a camera onto assigned targets rapidly from calculations on target positions and optimal trajectory. It may account for firing corrections due to target range and wind effects using wind sensors, terrain data, pressure, temperature, and earth curvature accommodating for bullet trajectory over large ranges. It can be an offensive sniper system whereby a target is locked in spite of movements, such as from a vehicle using stabilizing gyros and accelerometers, image processing, or sensor data to adjust for movements.

6 Claims, 13 Drawing Sheets

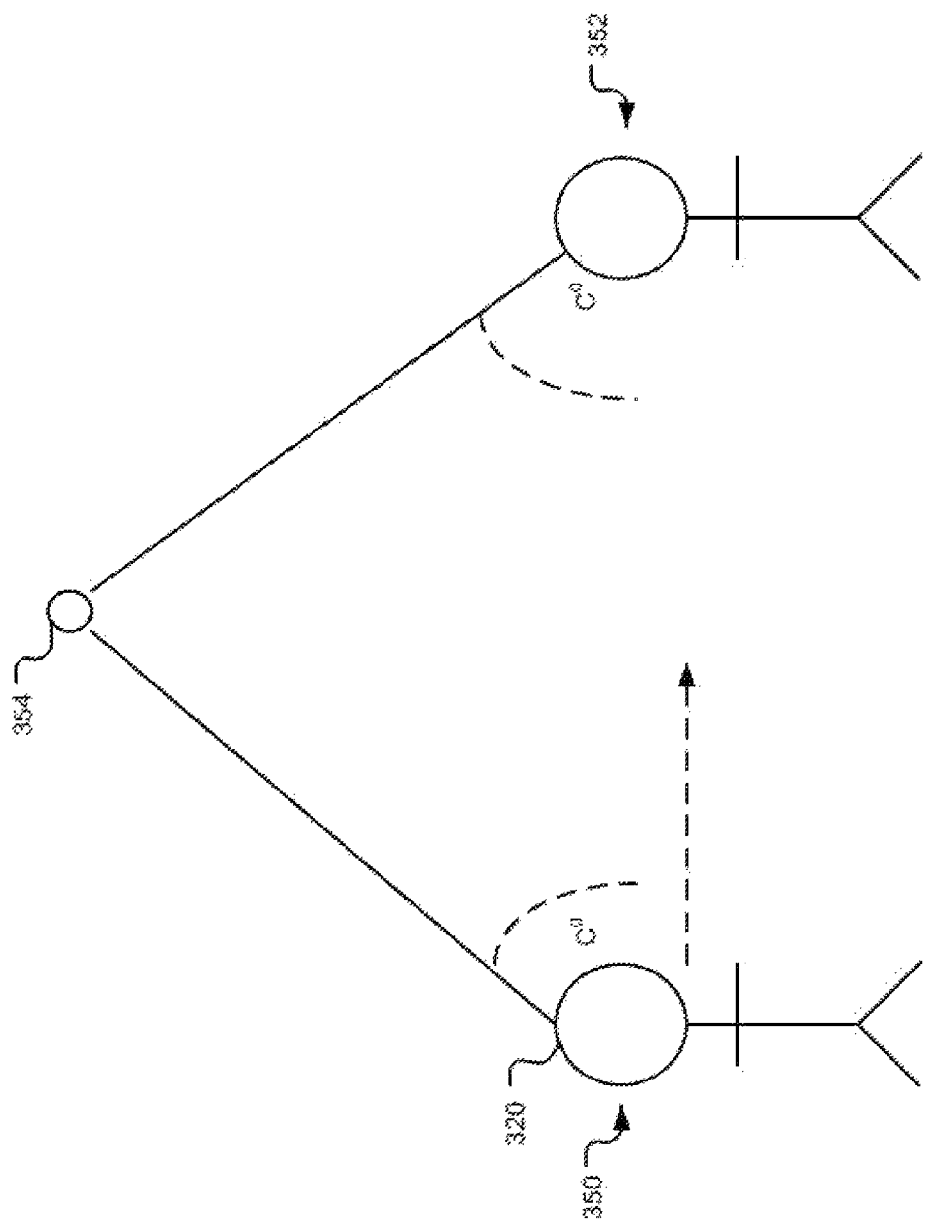

ANTI-SNIPER TARGETING AND DETECTION SYSTEM

CROSS-REFERENCE TO RELATED APPLICATIONS

This application is a continuation-in-part that claims benefit to U.S. patent Ser. No. 13/385,040 filed on Jan. 30, 2012, which claims benefit to U.S. Provisional Patent Application Ser. No. 61/626,702, filed on Sep. 30, 2011; U.S. Provisional Patent Application Ser. No. 61/575,131 filed on Aug. 16, 2011; U.S. Provisional Patent Application Ser. No. 61/626,701, filed on Sep. 30, 2011; and U.S. Provisional Patent Application Ser. No. 61/571,113, filed on Jun. 20, 2011, which are herein incorporated by reference in their entirety.

TECHNICAL FIELD

Aspects of the present disclosure involve systems and methods for real-time targeting, detection, coordinating, processing, and transferring of target information within and between anti-sniper systems arranged in various computing environments.

BACKGROUND

This application relates to pre-empting, target and weapon tracking, counteracting the attack of snipers by detection of snipers, or potential snipers, rapidly determining, assigning, coordinating, and transferring, the target information between anti-sniper systems, sniper helmet systems, other sniper equipment, or the sniper themselves. The sniper position information may be used by counteracting forces through target information sharing and/or by rapidly positioning a counter-sniper weapon. The counter-sniper weapon robotic arm may rapidly zoom, pan, and tilt a camera (infrared or otherwise as appropriate), based on target bearing, elevation, range, and wind condition calculations, immediately be moved upon sniper position to rapidly and accurately counter fire against any sniper or multiple snipers. Small human adjustments of pan, tilt, and zoom may be made upon human verification of target from rapidly zoomed camera. Pooled together, multiple systems may be designed to cooperate to nearly simultaneously coordinate, assign, and communicate target data and counter-fire on automatically or semi-automatically assigned multiple sniper targets in response all at once, where targets may be chosen programmatically (automatically or semi-automatically) optimally by relative unit positions. Targets may also be assigned based on terrain occlusions (e.g., based on terrain data from a terrain database), for maximizing safety of units based on these terrain occlusions from a terrain occlusion (one of sight from target) data base or calculation, and/or from system instrumentation of terrain (such as from three dimensional depth cameras). Snipers may be dealt with in multiple stages: pre-detection (includes IR/UV detection), barrel/glint (pre-fire) detection, fire detection (Infra-red and ultraviolet), bullet trajectory tracking, and fire return, as snipers come and go.

The combination of stereoscopic/spherical/depth (omnidirectional) cameras as well as a spherical/omni-directional microphone system and a radar system may be used to measure target range. Other techniques to determine target range may be optic flow estimation, laser range finding, terrain database information or any other suitable technique. If a muzzle flash or heated muzzle may be detected optically, because the speed of light is much greater than the speed of sound through air, the muzzle flash and muzzle sound detection may be used to determine range by taking the time difference at the start of the muzzle flash from the start of the optical detection and multiplying it by the speed of sound in air of which may be optimized using air pressure & temperature sensors if needed. Sensor integration and synthesis may be achieved by weighting the probability of accuracy, precision, and tolerances. Many of these techniques are well known in the art.

Currently no anti-sniper system exists that provides a seamless response at every stage of sniper interaction from pre-detection, to pre-fire warning, target assignment, fire detection, trajectory tracking, to coordinated fire response, as well as neural-fuzzy reinforcement optimization.

It is with these concepts in mind, among others, that various aspects of the present disclosure were conceived.

SUMMARY

A rapid and accurate sniper counter acting force response system that may not only allow operators to immediately respond but may also pre-empt the sniper by identifying sniper targets in advance using detection of movement or presence of infrared signatures of objects using frame by frame image, as well as gun barrel radar detection, processing adjusting for vehicle motion and vehicle position and utilizing existing information about the terrain. With a fast autonomous, robotic, zoom-able three-dimensional spherical camera, an operator may quickly scan and verify suspect targets. This may be done as a vehicle progresses through the field of operation, by target locking and tracking, while allowing the operator to simply press a "next target" (or "last target", or "next coordinated assigned target", like a target slide show) activation to quickly evaluate suspect targets in order to differentiate real from non-real targets. The return fire weapon and rapid zoom camera may help an operator further evaluate, from a great distance, what the target is holding or doing, and if the target is verified as threatening, the anti-sniper system may fire at the target with great accuracy (e.g., via global positioning, magnetic compass, etc.). Highly robust smooth image stabilizers, gimbals, and laser locking techniques along with gyroscopes may help stabilize and fix and follow the highly zoomed (infrared and/or other) camera onto the target while the vehicle is still in motion further enhancing the operator to verify if a target is threatening or not in advance of being sniped, allowing a pre-emptive snipe at a sniper. Anti-sniper systems may share critical data and coordinate actions with each other in real time in a firefight such as friendly positions as well as target positions, and friendly weapon vectors, trajectories, and friendly as well as target firing times.

The anti-sniper camera system may also be made to incorporate a multitude of zoomed cameras per target, as well as multiple robotic anti-sniper weapons so that even more rapid target assessment and response may be made. The anti-sniper system objective is ultimately to act as a very significant assured deterrent to firing any weapon at the anti-sniper system. It is to re-assert balance in asymmetrical warfare as well as mutual assured destruction of equal system capability, or even verifiable threat, of any gun weapon firing or pointing, thus making it a tremendous counter incentive to firing a gun, or even threatening any force carrying a fully autonomous (with manual override) integrated anti-sniper system. It greatly reduces the element of chance involved, and it is a powerful deterrent to not only firing a weapon, but even pointing it.

Other aspects involve a system, method, and/or computer readable medium for detecting a target. For example, the system includes at least one computing device comprising at least one processor to receive target data from an omni-directional stereoscopic device, the target data and identifying at least one movement of a potential target. The at least one computing device is further configured to determine a location of the potential target based on the target data, the location and range determined relative to the orientation of the computing device, thereby confirming the potential target as an actual target and generate a target vector for the actual target based on the location, the target vector indicating a firing direction for firing a projectile at the actual target.

DETAILED DESCRIPTION OF THE DRAWINGS

Figure 3A:
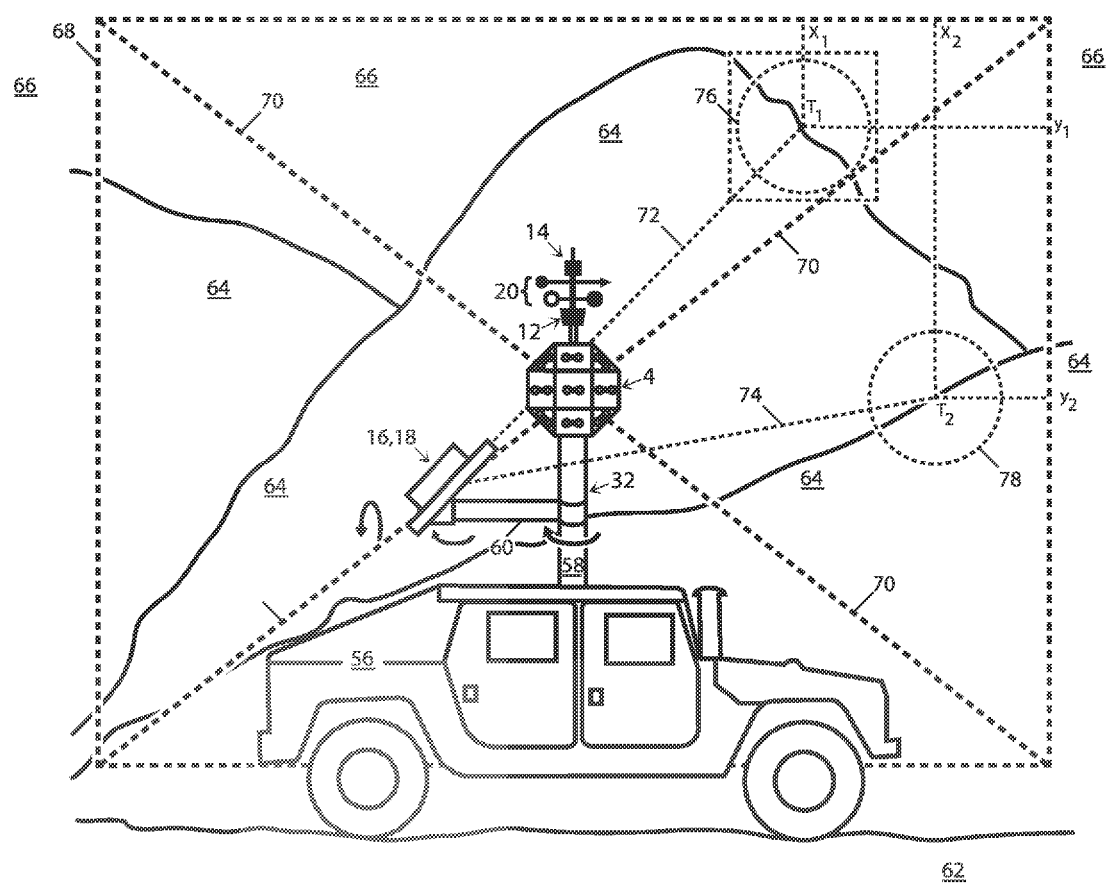

FIG. 3A shows the anti-sniper targeting and detection sharing system on top of an armored personnel vehicle, with spherical stereoscopic camera & microphone system, gimbaled weapon system with laser tracking and zoom IR (or other suitable) camera mounted on pole arm, with wind sensors, differential global positioning system, radar, glint detector, on top of spherical stereoscopic camera & microphone system, according to aspects of the present disclosure.

Figure 3B:
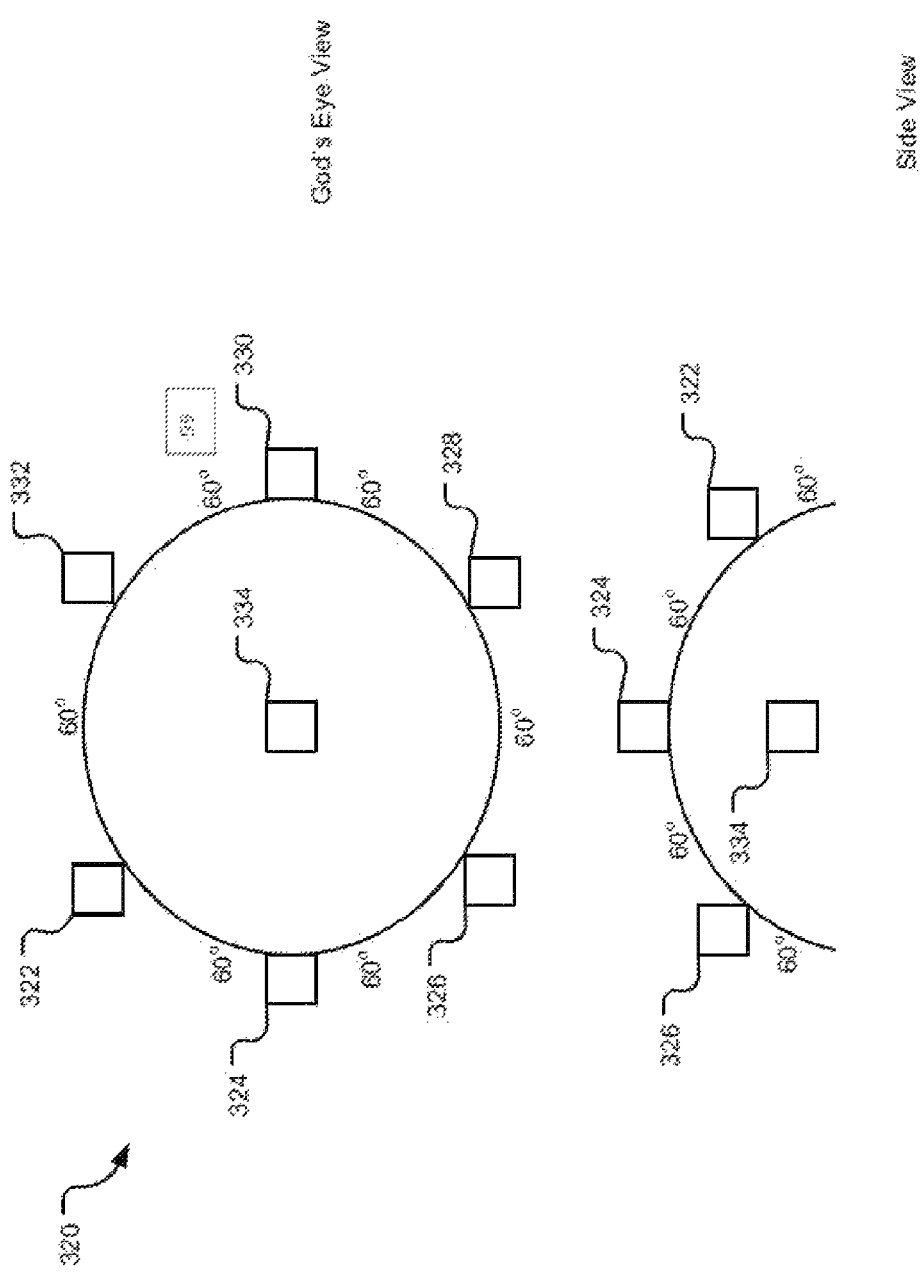

FIG. 3B shows the anti-sniper targeting and detection sharing system integrated within a user helmet, according to aspects of the present disclosure.

FIG. 3C provides an illustration of determining the location of a target using a helmet arrangement, according to one embodiment.

Figure 4:
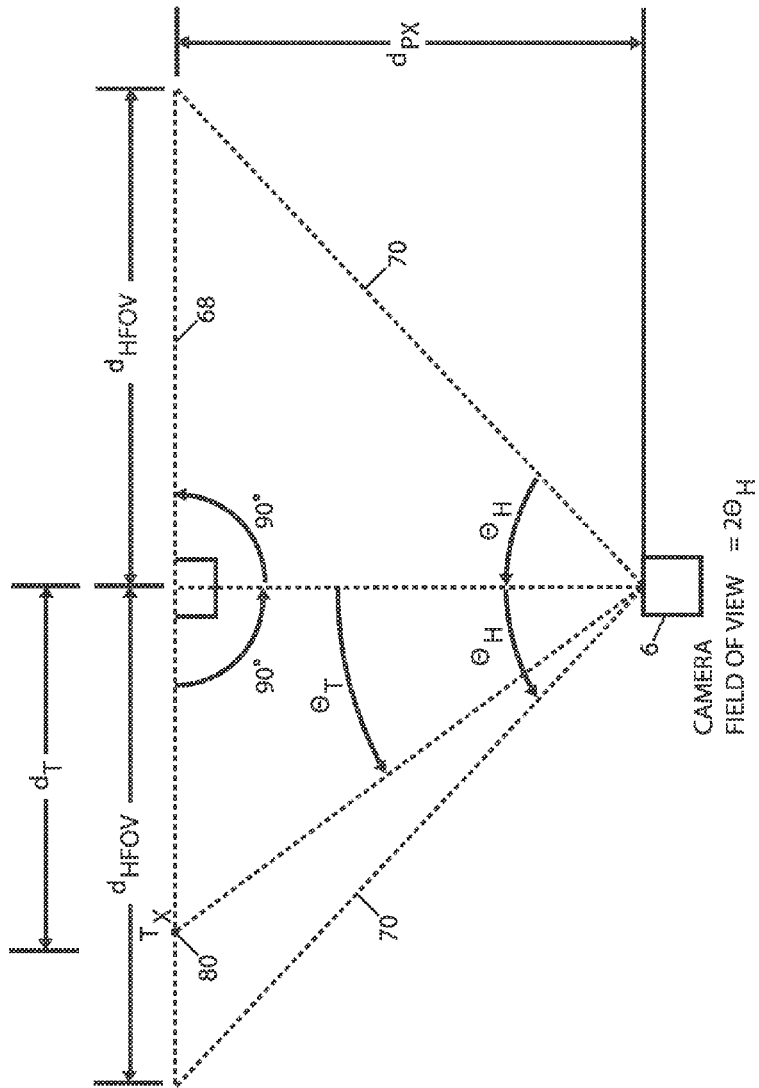

FIG. 4 shows a planar geometry of the field of view of a camera with projection of a target onto the field of view used to calculate target angles and range, according to aspects of the present disclosure.

Figure 5:
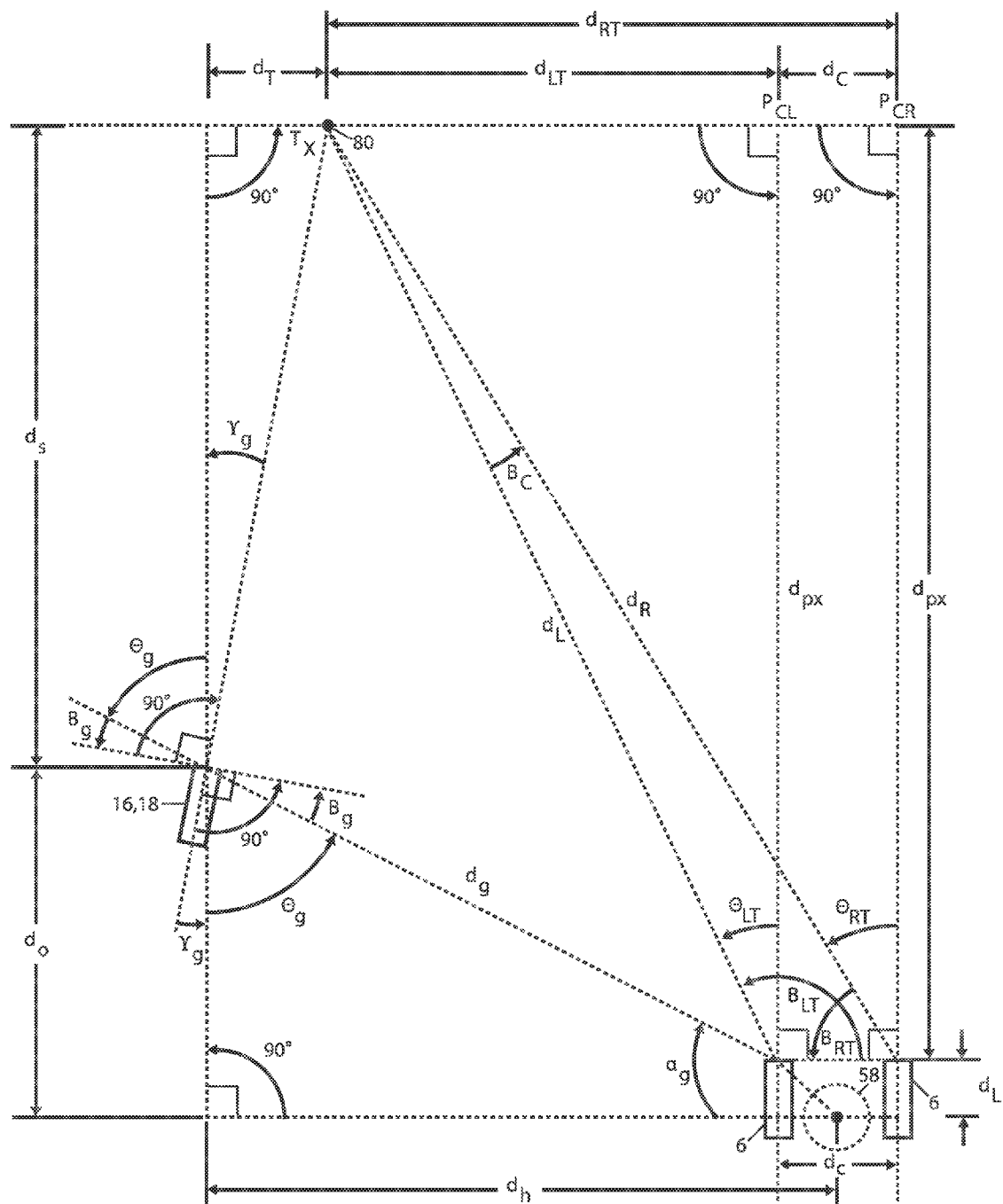

FIG. 5 shows a planar geometry of a pair of stereoscopic cameras projected onto the plane of the robotic camera weapon laser arm, according to aspects of the present disclosure.

Figure 6:
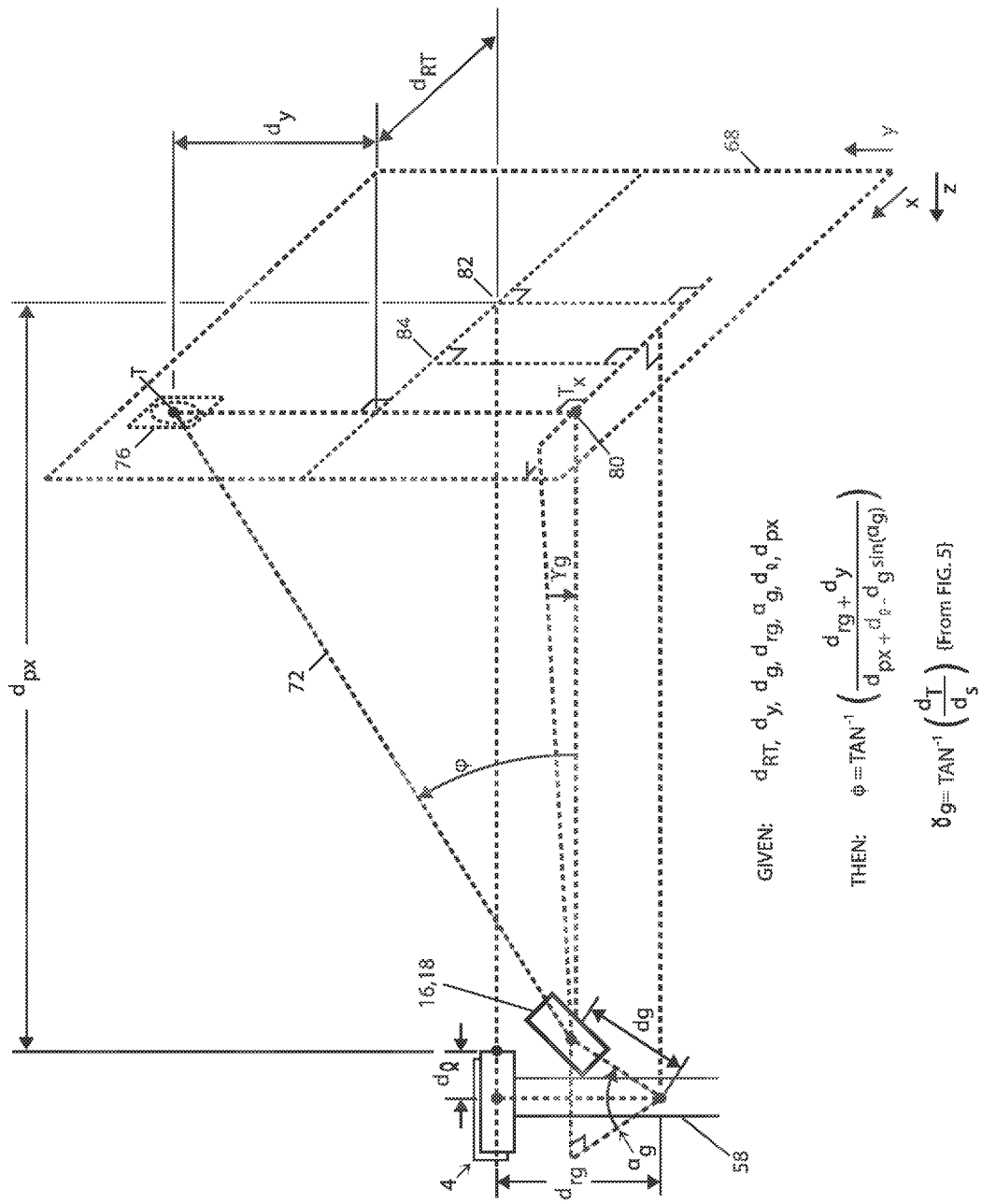

FIG. 6 shows a three dimensional perspective geometry of a stereoscopic camera pair with the robotic camera weapon laser arm, where the calculations for rapidly and automatically determining the angles, and range to position the zoomed camera/weapon system onto detected target(s) in rapid succession, according to aspects of the present disclosure.

Figure 7:
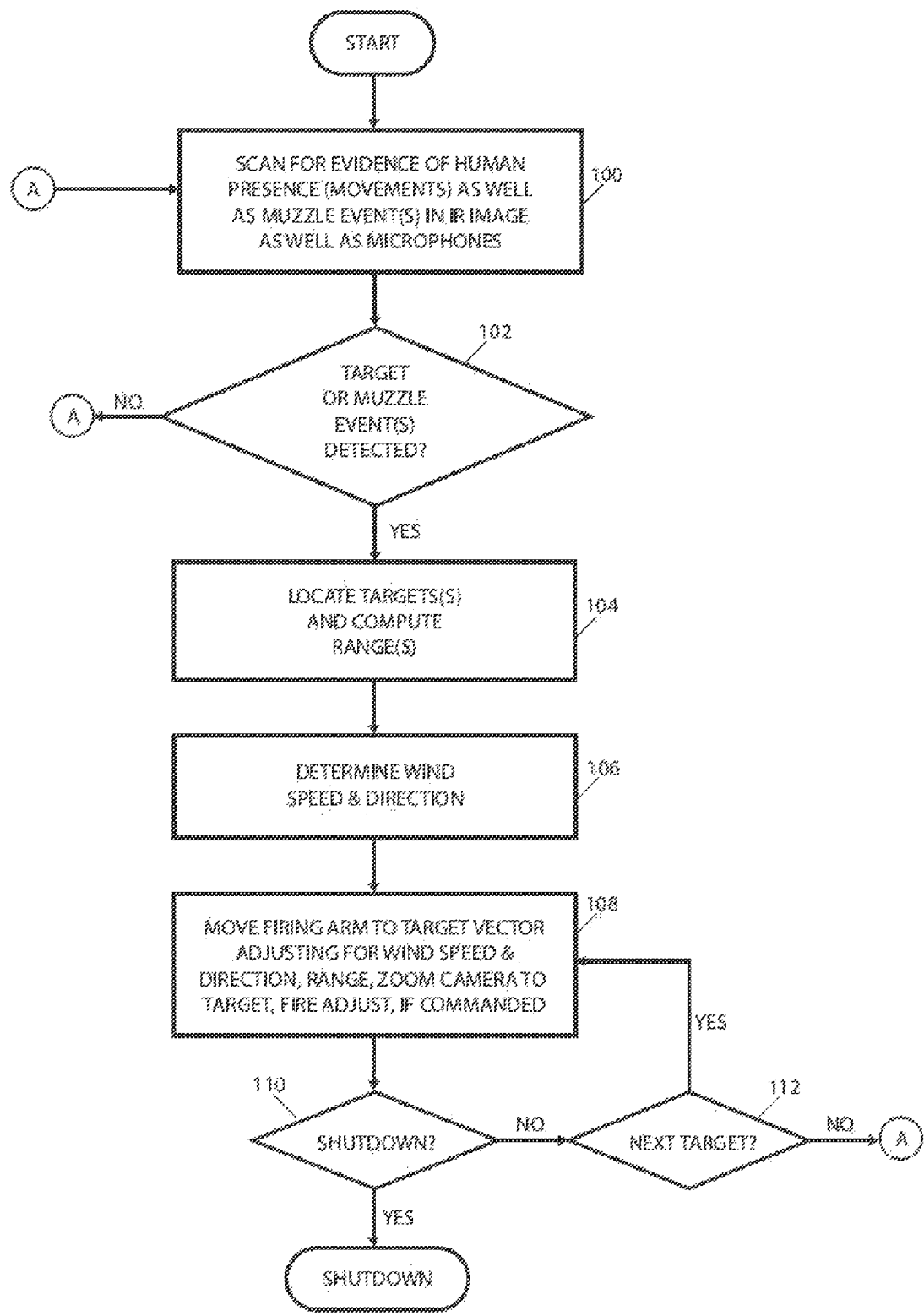

FIG. 7 is a flow chart of the system process of detecting targets and rapidly automatically positioning the zoom camera gyro stabilized laser weapon system onto the potential targets, according to aspects of the present disclosure.

Figure 8A:
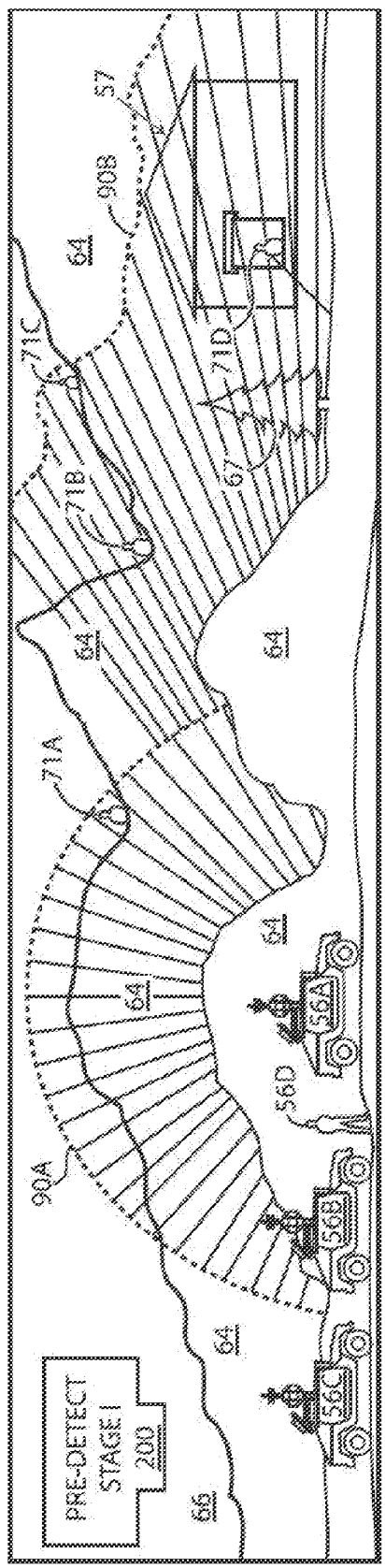

FIG. 8A is a coordinated sniper fires pre-detect stage diagram showing how the coordinated systems function in action, according to aspects of the present disclosure.

Figure 8B:
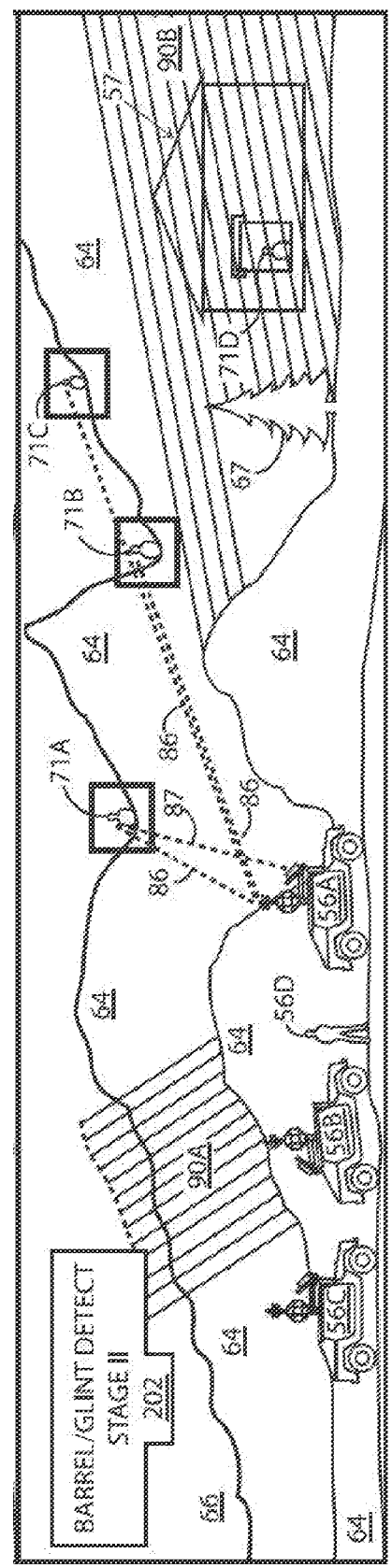

FIG. 8B is a coordinated glint/barrel detects stage diagram showing how the coordinated systems function in action, according to aspects of the present disclosure.

Figure 8C:
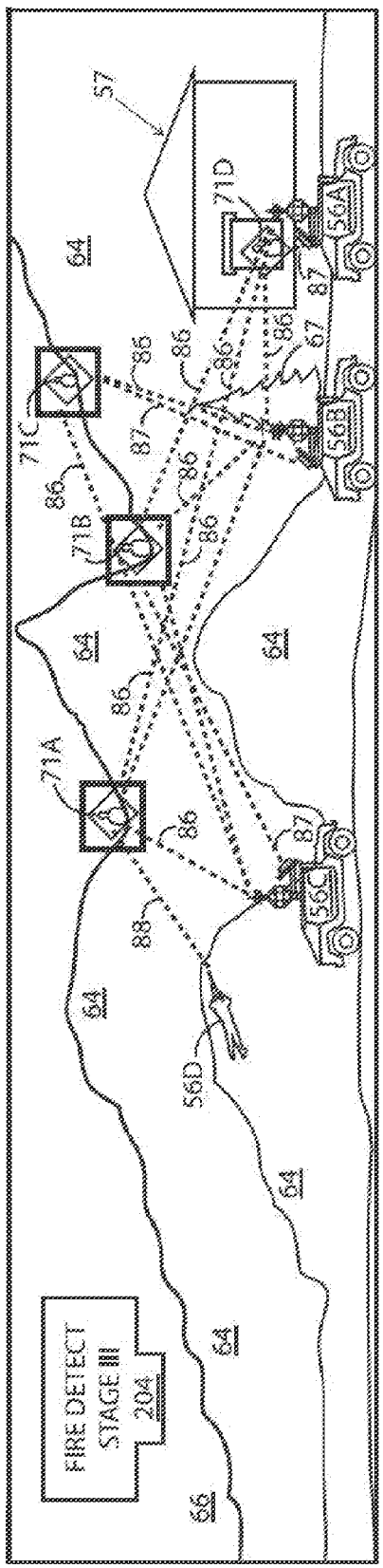

FIG. 8C is a coordinated fire detects stage diagram showing how the coordinated systems function in action, according to aspects of the present disclosure.

Figure 8D:
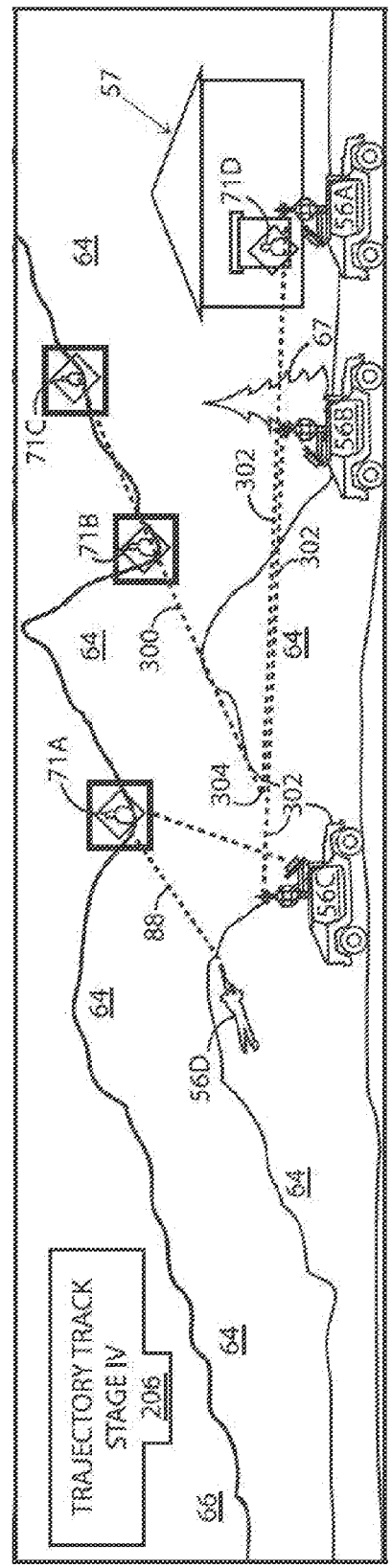

FIG. 8D is a coordinated trajectory track stage diagram showing how the coordinated systems function in action, according to aspects of the present disclosure.

Figure 8E:
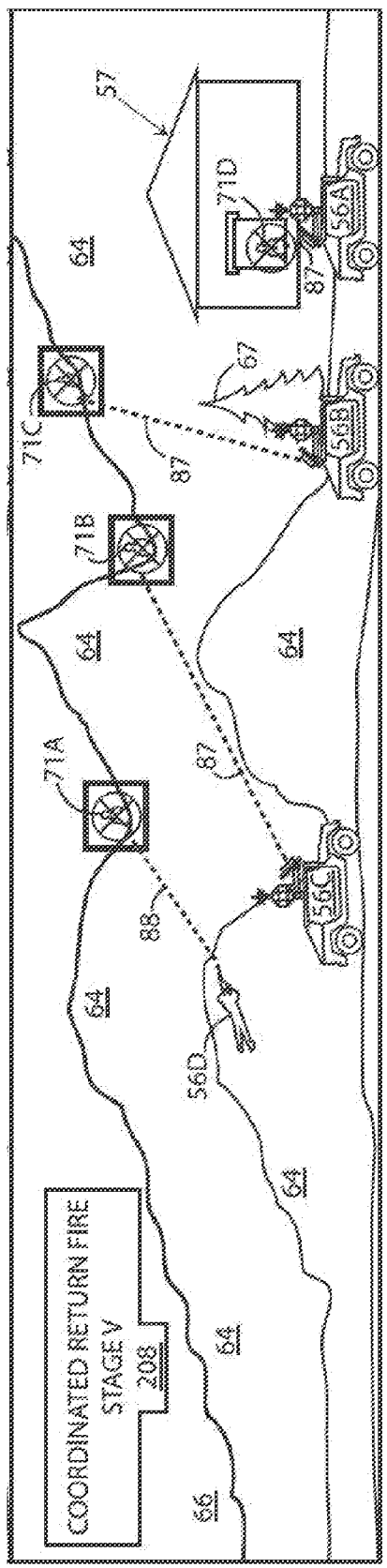

FIG. 8E is a coordinated fire return stage diagram showing how the coordinated systems function in action, according to aspects of the present disclosure.

Figure 9:
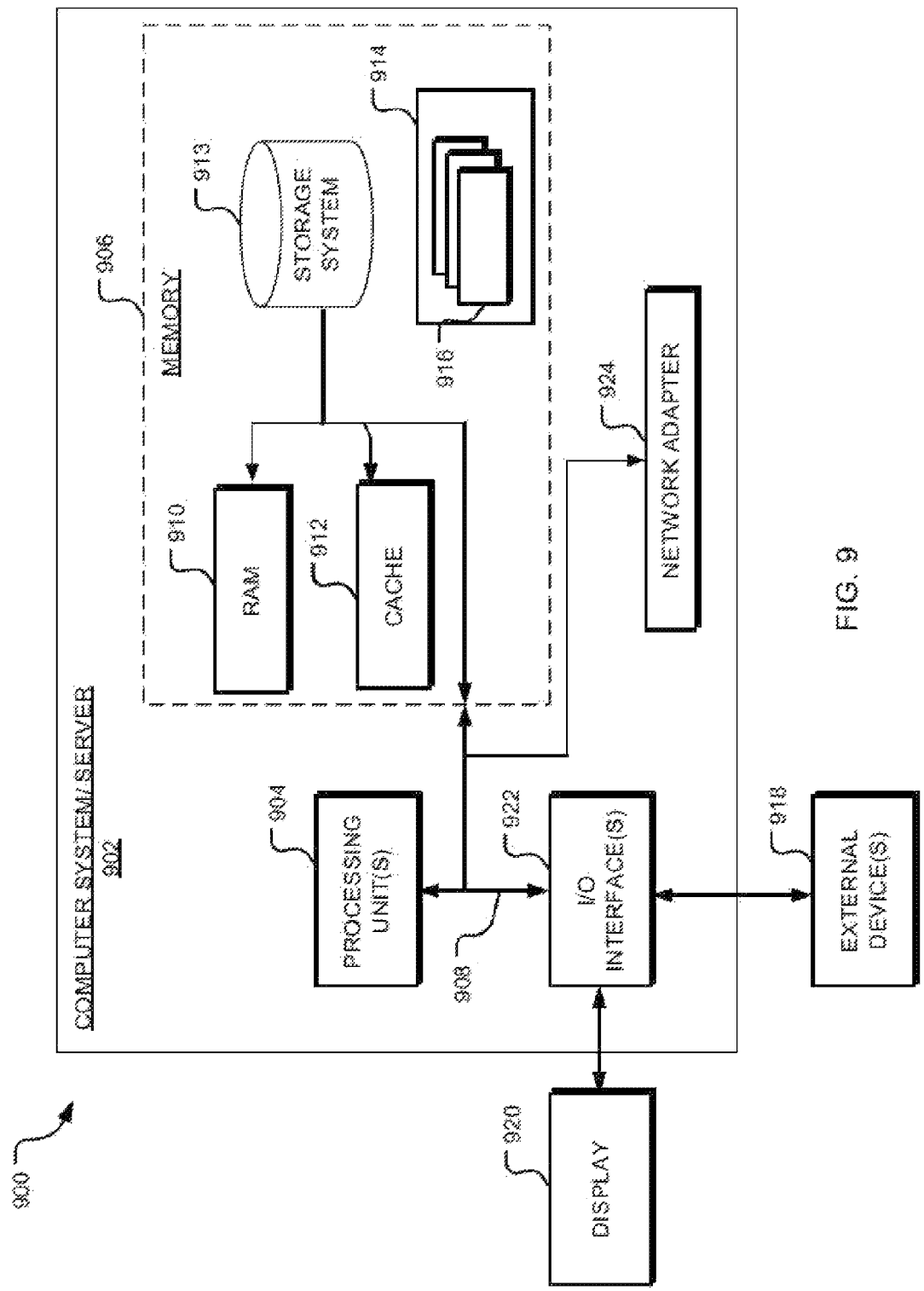

FIG. 9 is an illustration of the computer system 10, according to aspects of the present disclosure.

DETAILED DESCRIPTION

Aspects of the present disclosure involve an anti-sniper system that monitors and identifies sniper target(s). In various aspects, the system may continuously and autonomously monitor and track sniper target(s), as well as atmospheric conditions such as wind speed, wind direction, temperature, of pressure, unit positions, and/or the like, and automatically incorporates the obtained data with target bearing and planned computed optimal counter sniper-bullet trajectories based on ballistics (e.g. bullet/projectile mass, wind speed, distance to target, etc.) in real time, or near real-time.

Figure 1:
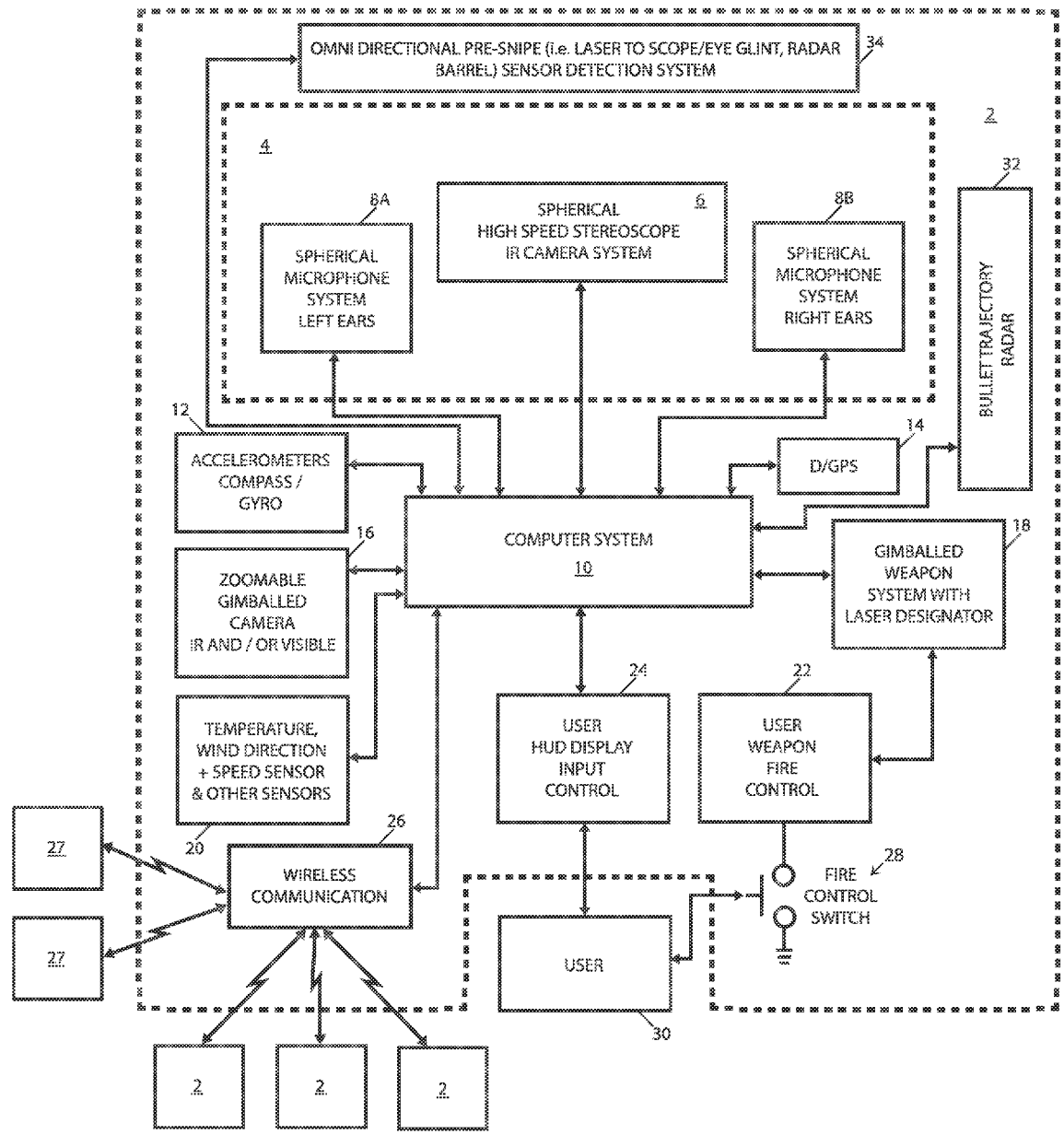
FIG. 1 is a block diagram of the overall anti-sniper targeting and detection sharing system, according to aspects of the present disclosure.

FIG. 1 shows a system block diagram of the anti-sniper targeting and detection system 2, according to one embodiment. As illustrated, a pre-snipe omni-directional sensor scope/eye glint/barrel infrared (IR)/radar detection system 34 is shown connected to a computer system 10 to detect evidence of snipers, scopes, and other optical sensors as well as gun barrels (if they are present) before a sniper is able to fire. Countermeasures to anti-sniper detection use anti-reflective layers, as well as honeycomb shapes on scope lenses. Some of these may be overcome by using different radar techniques such as varying the radar frequency to resonate at the shape of the honeycomb, or varying the frequency in the range of the possible shapes.

The anti-sniper system 2 is shown utilizing a spherical or omni-directional high speed stereoscopic IR and/or visible depth camera and stereoscopic or omni-directional microphone system 4 that contains a spherical (omni-directional) high speed stereoscopic infrared (IR, or other appropriate, such as a RGB—red, green, blue, ranging, time of flight) depth camera system 6 as well as a spherical omni-directional microphone system for left ear orientation 8A as well as a spherical microphone system for right ear orientation 8B. The spherical (omni-directional) microphone system may not only be used to detect source bearing (azimuth and elevation) of initial ordinance firing, but also detect trajectory from a bullet whizzing sound if the initial firing was not acoustically detected such as when a bullet is fired from a weapon utilizing a silencer.

The computer system 10 may process terrain and earth curvature data in projectile calculations. The computer system 10 may also process target data obtained from the camera/microphone system 4, or other sensors. The sensors may include: a Differential Global Positioning System (DGPS) 14; bullet trajectory radar system 32; accelerometers, compass, gyros 12 used to stabilize zoom-able spherical or omni-directional high speed stereoscopic IR and/or visible depth camera IR and/or visible camera 16 and weapon 18; wind direction, air temperature, air pressure, wind speed, or other sensors 20 to calculate source and trajectory to/from target information. Target information, from and to, other anti-sniper systems 2 for real-time triangulation and target location fixes, is communicated through high speed wireless communications 26. Bullet trajectory radar 32 may provide near instantaneous ordinance collision avoidance warning commands by determining ordinance trajectory path and anti-sniper system 2 unit positions.

Microphones 8A may be used to detect bullet impact sounds to verify trajectory tracking performance from trajectory radar 32. The sound recorded from bullets whizzing by in the air near the microphones 8A may also be used to verify trajectory tracking performance from trajectory radar 32. On an anti-sniper system 2 HUD display input control 24, this may be annunciated on speakers in or outside computer 10 or displayed, such as halt, duck, move left, move right, move forward, and move backward, on bullets fired, detected, and tracked at long range.

Other wireless communications 26 data may be sent to and from other remote systems 27, to be relayed or routed, such as through satellites, drones, aircraft, or other vehicles. Target data that is processed is used to rapidly position gimbaled weapon system with laser designator 18 that may be mechanically connected to automatically or manually zoom-able spherical or omni-directional high speed stereoscopic IR and/or visible depth camera and/or visible camera 16 through computer 10. Multiple sniper targets may be assigned, shuffled, prioritized, and have status tracked and shared amongst multiple anti-sniper systems 2 to autonomously coordinate a rapid anti-sniper response optimally assigning sniper targets to each crew based on unit position, status, and weapons capabilities. The robotic gimbaled weapon system with laser designator 18 and zoom-able spherical or omni-directional high speed stereoscopic IR and/or visible depth camera and/or visible camera 16 may rapidly and automatically swing into position of highest probability of snipers based on prior history/intelligence data, and also has manual operational over-ride capability by human operator. The robotic gimbaled weapon system with laser designator 18 and zoom-able spherical or omni-directional high speed stereoscopic IR and/or visible depth camera and/or visible camera 16 may be made to move at high speed, faster than any human may move, and be made more accurate and precise at dynamically firing back, even while vehicle is in motion, than a human sniper by using gyros with high speed actuators, with automatically stabilizing shock absorbing mast/boom, where the human decision is made to fire from the zoomed scope view. To further enhance the response time, the gimbaled weapon 18 may be a high powered laser, DAR, etc. The gimbaled weapon 18 may also act just as a target designator to work in coordination with an aircraft or ship, or other weapon system.

Computer 10 may display target data including zoomed target on a HUD (Heads Up Display) with input controls and speaker/alarm 24 for user 30. If user 30 determines that a target is real and is a threat, may fire at target using gimbaled weapons (rifle, automatic weapon, missile, high powered laser, or other weapon) system with laser designator 18 controlled by user weapon fire control 22 via fire control switch 28. The anti-sniper system 2 may work independently of other anti-sniper system 2 units while at the same time also join in to work as a coordinated crew or to break off if needed. The sensors of the anti-sniper system 2 may self-check and report if they are valid, invalid, and failed by marking the sensor data accordingly. The anti-sniper system 2 detection and fire response may incorporate neural-fuzzy reinforcement learning technology to optimize detection and response. A high speed rapid response, such as returning sniper fire when fired upon from a high speed passing vehicle may be incorporated into the anti-sniper system 2. Incorporating autonomous (or semi-autonomous) zoom camera system as well as a radar may be useful at preventing false alarms that could be triggered in acoustic and fire flash detection systems alone due to other events such as from firecrackers being ignited.

Multi anti-sniper system 2 target assignments may be both independent and dependent, or handled by a ranked order of anti-sniper systems 2 such that one anti-sniper system unit 2 acts as a target assignment controller, of which may automatically hand off target assignment control to other anti-sniper units 2 as they are removed and added to the system.

Figure 2:
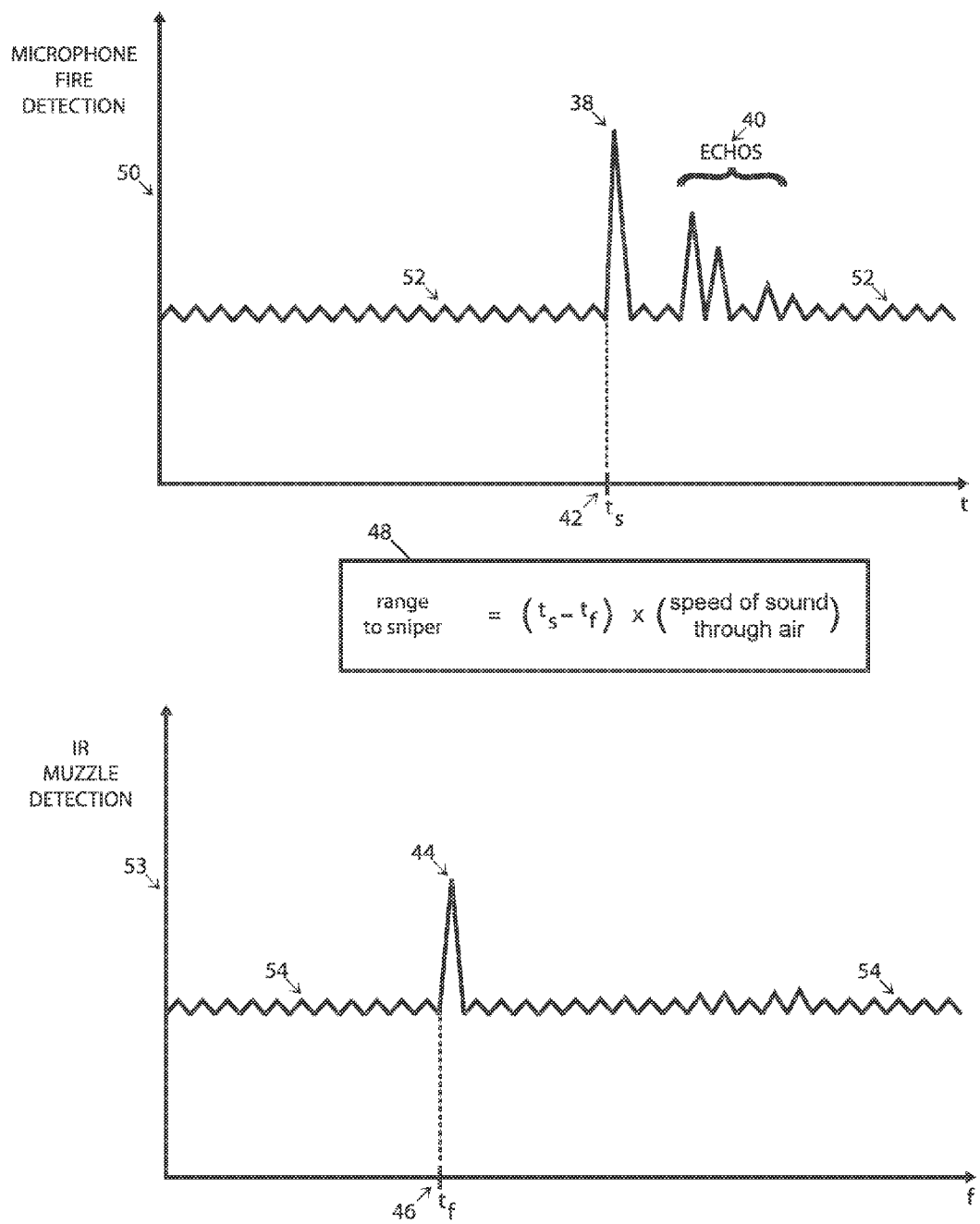
FIG. 2 shows prior art calculations of how range may be estimated by combining acoustic sensors (microphones) with optics and taking advantage of the speed of light being much greater than that of sound to determine range of gun fire, according to aspects of the present disclosure.

FIG. 2 illustrates using a process for detecting weapon fire (e.g., gun fire) to determine a target range by taking the difference between two measured events: 1) the first non-friendly identified gun fire sound wave of highest magnitude or the sound signature (not associated with a weapon discharge); subtracted from 2) a non-friendly identified muzzle flash heat signature pixel detected in the infrared camera. Friendly's and non-friendly's may clearly be identified and displayed on a Head's Up Display (such as in the user 30 HUD 24 of FIG. 1).

In the illustrated embodiment, the gun fire sound has a peak signal 38 shown in the upper graph of microphone fire detection magnitude 50 amongst sound echo's 40 and noise 52 where the start of the gunfire sound signal starts at $t_s$ 42. The sound from known friendly fire may be filtered out, based on known time, duration and pulse width of friendly fire, and relative friendly firing position (all wirelessly transferred within the system), thus reducing false alarms and system confusion during a fire fight with lots of bullets being fired. The lower graph shows the IR camera muzzle flash/heat detection magnitude 53 where the peak detection 44 at time $t_i$ 46 shown amongst signal noise 54. The range to sniper may then be calculated by subtracting the two times and multiplying by the speed of sound in air as shown 48. Just as friendly acoustic fire sounds may be filtered, so may friendly positions muzzle flashes may be identified and filtered, via high speed real-time encrypted position network transfer, where laser communications may be used in case of spread spectrum radio frequency jamming is occurring.

FIG. 3A shows the anti-sniper targeting and detection system applied to an armored personnel vehicle 56 on ground surface 62 where a mounting post 58 is used to support the spherical high speed stereoscopic depth camera and omni-directional microphone system 4 as well as fire control arm 60 with zoom-able spherical or omni-directional high speed stereoscopic IR and/or visible depth camera (or other appropriate) camera 16 with weapon that has a laser designator system 18 whereby if a target is an unfriendly tank, or similar, a drone, or aerial strike may be called in on target. Mounted on top of the spherical high speed stereoscopic camera and microphone system 4 is accelerometers, gyros 12 as well as wind speed and direction sensors 20 along with a differential global positioning system 14 all used to more accurately aim fire control arm onto target 76 on mountain terrain 64. Next target 78 in system targeting sequence is where fire control arm 60 may rapidly move to and zoom automatically. The field of view 68 including sky 66, and mountains 64, of one camera of the spherical stereoscopic camera system 4 are shown with edges 70. Gyros 12 may also be mounted in fire control arm 60 as well as on camera 16, with any means necessary for shock absorption. Zoom camera 16 may also be mounted on an independent robotic arm 58 of the fire arm 60 such that the zoomed view is maintained even while firing.

FIG. 3B illustrates the anti-sniper targeting and detection system applied to a helmet arrangement 320 (e.g., a soldier's helmet) that may worn on the head of a sniper, soldier, or other person. As illustrated, the helmet 320 may include 6 cameras 322-334 each of which may be, for example, a spherical or omni-directional high speed stereoscopic IR and/or visible depth camera (or other appropriate) camera optionally combined with an omni-directional microphone system. As in the embodiment of the FIG. 3A, the helmet arrangement 320 may be used to identify a target and determine whether the target is unfriendly. If a target is determined to be unfriendly, a drone, or aerial strike may be called in on the identified target. In one embodiment, the helmet arrangement 320 may include accelerometers, gyros, as well as wind speed and direction sensors along with a differential global positioning system(s), any of which may be used to more accurately identify targets and fire upon targets.

FIG. 4 shows the surface geometry of one camera 6 of the spherical stereoscopic camera and microphone system 4 illustrated in FIG. 3A, with field of view 68 with field of view projection edges 70 with target horizontal projection point 80. In another embodiment, FIG. 4 shows the surface geometry of each camera 332-332 of the spherical stereoscopic camera and microphone system 320 illustrated in FIG. 3B. In either embodiment, the illustrated embodiment only represents a single eye, such as the right eye and it is contemplated that there would be similar geometry for the other eye with a seven (7) degree offset between each eye.

In the illustrated embodiment, the angle of the target, $\theta_T$, may be calculated by the distances shown, given the angle of the field of view ($2 \times \theta_H$). There may be 6 to 8 cameras depending on the optics of the camera. Optic issues make it hard to produce cameras with a 90 degree FOV. If a good quality 90 degree camera is found then 6 cameras will be used. This has 4 cameras making a 90 degree box, 1 pointing up, and 1 pointing down. Otherwise there may be 6 60 degree cameras, 1 pointing up, and 1 pointing down. Each camera face has a left set of lenses and another set of right lenses with 7 degree separation. Each lens set has a visible light lens, an IR lens. A UV lens, and a Night Vision lens.

FIG. 5 shows the surface geometry of a stereoscopic camera pair 6 with control fire arm 16, 18 all projected on one plane with target 80 also projected onto the same plane. Given the distance of the fire control arm, the distance between the stereoscopic cameras, the length between the camera focus and the center point of rotation of the control arm, and the distances provided, the horizontal angle of the control fire arm 16, 18, may be positioned onto the target, given the control arm angle which may be rotated into position so no target is occluded for optimal zooming, laser designating and firing. If all angles of the spherical stereoscopic camera pairs 6 are known relative to the fire control arm, all targets may be easily identified and processed to rapidly calculate and position the fire control arm onto the target. Target locking may be done in priority order such as nearest range target, or highest up target, or any other desired order. Range to target may also be determined if a camera used is a depth sensor camera.

FIG. 6 shows a three dimensional perspective geometry of one spherical stereoscopic camera pair with microphone 4 (that would receive the highest amplitude gun fire sound) mounted on support post 58 and the fire control arm 16, 18 aimed at target 76 projected on target plane camera viewing plane 68 via straight line vector 72 to target 76. Return fire trajectory is not shown, but would be a slight arc, determined based on distance to the target, gravity, and bullet velocity. Center of right camera field of view 82 as well as center left camera field of view 84 is shown on target plane camera viewing plane 68. Target 76 is shown projected at 80 to plane perpendicular to target plane 68 that intersects fire control arm 16, 18 mounting plane. The horizontal angle $\gamma_g$ as well as vertical angle $\phi$ of the fire control arm 16, 18 may then be calculated and thus rapidly moved to the target vector for each target 76 or other targets in assigned or selected sequence, from the distances provided from the spherical stereoscopic camera, as well as the fire control arm rotated position $\alpha_g$.

FIG. 7 shows a flow chart of the anti-sniper targeting system 2, where the system scans via radar/laser/optics for evidence of human presence/movement(s), barrel, scope, eye, binocular, or sensor (Target Latitude, longitude, and elevation is determined so data can be transmitted to other friendly systems within the target range) glint, as well as muzzle event(s) in IR images as well as from microphones in process block 100. When the anti-sniper targeting system 2 detects such evidence, at decision block 102, the location of the target(s) as well as the ranges are computed at process block 104.

According to one embodiment, the location of target may be determined according to a triangulation, as is generally understood in the art. In particular, the location of a particular sniper target may be determined by measuring angles to the potential location from known points at either end of a fixed baseline. Thus, in the context of the ant-sniper system 2, triangulation may be used to calculate the coordinates and distance between the location of the user 3 and the identified target. Specifically and in one embodiment, an angle "A" between the location of the user 3 and the identified target may be determined for a first view of a camera A (e.g., the camera illustrated in FIG. 4) and a second angle "B" between the location of the user 3 and a second view of a camera B (e.g., the camera illustrated in FIG. 4). The known length and/or coordinates of the cameras A and B may be used to find the coordinates of the identified target and the distance between the identified target and the location of the user 3.

In the context of the helmet arrangement (e.g., helmet 320), triangulation may be performed and/or otherwise calculated using a single helmet unit, if the unit is moving and gathers data from two separate locations. FIG. 3C provides an illustration of determining the location of a target using a single helmet 350. In the illustrated embodiment, a soldier is located at a first position at 350 and the helmet 320 determines or otherwise captures a first view of a target 354. Subsequently, the soldier moves to a second position at 352 and determines a second view of the target 354. Based on the first view and the second view obtained by the helmet 320, particularly, the distance between the first position 350 and the second position 352 and an angle "C" between either the first position 350 and the target 354 or the second position 352 and the target 354 coordinates of the target 354 may be identified and the distance between the target 354 and the location of the first position 350 and/or the second position 352 may be identified.

In other embodiments, valid target information as well as other sensor data is shared amongst networked anti-sniper systems (e.g., anti-sniper targeting systems) wirelessly. Targets are assigned to anti-sniper systems such that all target assignments are distributed optimally such that they are easiest and most effective to respond back. For example, targets may be assigned according to which anti-sniper targeting system is the closest and/or includes the best line of sight bearing to the target. Zoomed target camera data may also be shared amongst anti-sniper systems. Target assignment may be one to one, or by many to one, or assigned in a maximally optimal tactical manner.

The wind speed, wind direction, temperature, and pressure or other ballistic (e.g., bullet velocity and weight) factor sensor is measured at process block 106 and distributed amongst units, and estimated by taking the average from multiple valid sensors to adjust for any firing compensation required over long ranges. The fire control arm is then moved to a coordinated assigned target vector adjusting firing angle for aggregated sensor wind speed, direction, temperature, aft pressure, range, and zoomed camera to target, to be adjusted automatically and/or manually, and fire if commanded at process block 108 where the status of the target post fire, if hit, has an assigned probability of disabled, and this probability is reported to other anti-sniper systems. The system checks for shutdown at decision block 110, if not, the next target check occurs at decision block 112, if yes, then the control arm is rapidly positioned onto the next target. If there are no new targets, then further target scanning occurs.

FIG. 8 shows how the coordinated anti-sniper systems may work in action to detect, and suppress sniper fire. This is shown in five stages: STAGE I 200 (FIG. 8A), pre-detect; STAGE II 202 (FIG. 8B), Barrel/Glint detect; STAGE III 204 (FIG. 8C), fire detect; STAGE IV 206 (FIG. 8D), trajectory track; and STAGE V 208 (FIG. 8E) coordinated fire return. Although the illustrated embodiment uses the armored vehicle as an example and for illustrative purposes, it is contemplated that the various stages described below may be applied to or otherwise used with a helmet arrangement, such as for example when a soldier is deployed to combat wearing a helmet arrangement (e.g., helmet 320).

As illustrated, vehicles in motion may fire in response while in motion using calculations to adjust, based on the vehicles telemetry data or the first vehicle 56A may detect the sniper, then become out of line of sight of the sniper, where the second vehicle 56B may become in range (line of sight), and be able to automatically be assigned the target because of position, and programmatically respond near instantly with camera near instantaneous zoom onto sniper for verification and firing upon as the real time target data is wirelessly transferred from 56A to 56B. Terrain data is also weighed for the estimated location of the solder/vehicle at the time of fire to adjust for elevation and trajectory path. This data is able to be passed on to all vehicles and personnel (56A, 56B, 56C, and 56D) in the group so that each vehicle and personnel passing may fire back and the crew may visually identify and verify target before firing. Although not shown in FIG. 8A, upon sniper detection, warning terrain zones may be clearly marked in real time of each unit's HUD (particularly useful for dismounted unit 56D) for anything within line of sight or within projectile range of hostile detected. This automatic target sharing system with a manual override is not limited to vehicles; it may be applied to aircraft, ships, or a combination.

In STAGE I 200 of FIG. 8A three armored personnel vehicles 56A, 56B, and 56C are shown with anti-sniper systems 2 where the forward personnel vehicle 56A may be made specialized in IED (Improvised Explosive Device)/land mine detection. Dismounted person 56D with miniaturized (trimmed down) soldier carried anti-sniper system 2 is shown between armored personnel vehicles 56A and 56B. The vehicles 56A, 56B, and 56C and dismounted person 56D are shown travelling from left to right in front of mountainous terrain 64 under sky 66. A tree 67 is shown next to a building 57 with hidden sniper 71D. Occlusion regions that are out of sight of the anti-sniper system 2 sensors are shown as 90A and 90B. These occlusion regions may be calculated and displayed on the anti-sniper HUD using terrain databases, and from data from depth sensors. Other undetected sniper positions are shown as 71A, 71B, and 71C shown along mountain ridges 64.

In STAGE II 202 of FIG. 8B the three armored personnel vehicles 56A, 56B, and 56C as well as dismounted person 56D are shown moved slightly forward with occlusion zones 90A and 90B updated accordingly where armored personnel vehicle 56A detects barrel or glint, or detects barrel radar reflection of three snipers 71A, 71B, and 71C via line of non-occluded sensor sights 86 whereby gimbaled weapon system 18 is automatically locked in and zoomed onto detector sniper target 71A via planned calculated counter fire trajectory path 87. Detected sniper targets 71A, 71B, and 71C are displayed with squares on them, recorded, encrypted, and wirelessly shared amongst anti-sniper units in the system in real time (three armored personnel vehicles 56A, 56B, and 56C as well as dismounted person 56D) and may also be encrypted, and communicated in real-time to other systems (27 through wireless communications 26 of FIG. 1 such as through satellite) in the network.

In STAGE III 204 of FIG. 8C after sniper units were preemptively detected via IR glint, sound, night vision, or radar detection of barrel in STAGE II, target data was passed to dismounted person 560 as a preemptive warning and anti-sniper system (2 of FIG. 1) automatically recommends to position self in an anti-sniper firing position on top of small hill 64 based on terrain data calculations as shown by indicating optimal positioning directions and annunciating sniper warnings in dismounted person's 56D HUD. Dismounted person 56D scopes out and aims at sniper 71A with line of sight 88 waiting further command and automatically reporting to anti-sniper system (2 of FIG. 1) units that target 71A is acquired by dismounted person 56D. Armored personnel vehicles 56A, 56B, and 56C are shown moved further forward to the right to optimize targeting of detected targets as recommended, such as by annunciation of "unit '56A' move forward 30 meters" by anti-sniper system (2 of FIG. 1) where sniper 71D inside building 57 is spotted by armored personnel vehicle 56A anti-sniper system (2 of FIG. 1) via glint/barrel detection path 86 where vehicle weapon is automatically positioned and locked onto planned trajectory path 87. Armored personnel vehicle 56B is shown in front of tree 67 locked onto detected sniper 71C via glint/barrel sighting 86 and planned fire real-time response calculated and sensed optimal trajectory 87 arm is rapidly and autonomously rotated and adapted into position based on real wind magnitude and angle acquired from wind direction and magnitude sensors of which may be autonomously corrected from apparent wind from vehicle motion as well as aggregated amongst sensors.

Friendly unit positions (56A, 56B, 56C, and 56D), weapon angle, weapon target, weapon or other ordinance firing (to differentiate with enemy fire/explosion, such as by HUD color display to indicate if a firing/explosion cause was friendly or hostile), are autonomously reported, shared, and tracked in real time, encrypted and wirelessly transferred to avoid friendly fire incidents, and to optimize coordination and response of target sharing where data may be displayed/annunciated on all personnel HUD's. Friendly's are clearly identified and marked in HUD display.

In one embodiment, friendly units may be pre-assessed by radio communication(s), sniper system communication(s), tagged as friendly (a target can be tagged as friendly by a soldier and the target object tracked as friendly, image processing, or RFID/wireless communication). Sniper targets 71B and 71A are also detected by IR glint and/or radar barrel detection by armored personnel vehicle 56A and 56B as shown by the detection paths 86 where armored personnel vehicle 56B has sniper 71C locked on with automated positioning fire arm planned trajectory path 87 where sniper 71C fire detection weapon IR muzzle flash indicates sniper 71C weapon is fired where position is further verified if not preemptively detected. Snipers may also be preemptively detected, targeted, and tracked (via image processing or otherwise) by IR heat signature which may be very visibly distinguished from terrain. Sniper 71B is shown scoped out on line of sensor sight 86 by armored personnel vehicle 56C where weapon is rapidly automatically positioned, adapted, and optimized based on calculated real wind and vehicle motion along with trajectory equations by sniper's 71B three dimensional relative positions. Snipers 71A and 71C are also detected by armored personnel vehicle 56C as shown by line of sensor sight paths 86. Sniper targets 71A, 71B, 71C, and 71D status, such as firing trajectories, or no longer firing, appears injured, or killed, are reported and distributed as marked probabilities in real time. In STAGE III if no snipers were preemptively detected, they may be otherwise detected at this STAGE III by theft weapon firing.

In STAGE IV 206 of FIG. 8D bullet 304 of sniper 71C has its trajectory 300 tracked in real time (using mean of multiple triangulated anti-sniper 2 of FIG. 1 unit sensors, throwing out spurious data and noise) by high speed bullet tracking radar (32 of FIG. 1) sight lines 302 on armored personnel vehicles 56A, 56B, and 56C. At this stage it is clear the sniper 71C is hostile whereby a highly coordinated efficient semi-autonomous rapid return fire response occurs at STAGE V, controlled by rapid autonomous zoom visual inspection with rapid target gyro stabilized rapid robotic weapon zoom views may be rapidly shuffled through to verify if each target is verified hostile. Targets may be rapidly assigned in real time to optimal units based on position and weapons capability available, threat level, and based on target type.

At STAGE V 208 of FIG. 8E the targets were verified hostile, engaged, and destroyed in rapid near simultaneous succession as shown by the X's. If targets were missed or new targets were found, targets may be re-assigned and transferred between units rapidly and autonomously in real time with target status (Engaged, New, Detected, Tracked, Lost, Partly Destroyed, Destroyed) continually updated where numbers of rounds along with round types, round source into target may be tracked, recorded, and reported as well as used for computing probability of target disabled. A performance recording and measurement system may be incorporated for post battle analysis, whereby the successful bathes, and unsuccessful, may be reinforced into the neural-fuzzy reinforcement system, based on parameters such as injury types, numbers, and fatalities, if any.

To help avoid friendly fire, each anti-sniper system 2 may share gun position using gun orientation sensors to provide gun barrel angle, and complete calculated planned fire trajectory that may be displayed on the HUD of each anti-sniper system 2 user where anti-sniper system 2 users are clearly identified on the HUD's.

FIG. 9 illustrates an example of a computing node 900 which may comprise an implementation of the computer system 10. The computing node 900 represents one example of a suitable computing device and is not intended to suggest any limitation as to the scope of use or functionality of embodiments of the invention described herein. Regardless, the computing node 900 is capable of being implemented and/or performing any of the functionality described above.

As illustrated, the computer node 900 includes a computer system 902, which is operational with numerous other general purpose or special purpose computing system environments or configurations. Examples of well-known computing systems, environments, and/or configurations that may be suitable for use with computer system/server 902 may include personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 902 may be described in the general context of computer system executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote servers that are linked through a communications network. In a distributed cloud computing environment, program modules may be located in both local and remote computer system storage media including memory storage devices.

As shown in FIG. 9, computer system/server 902 in computing node 900 is shown in the form of a general-purpose computing device. The components of computer system/server 902 may include one or more processors or processing units 904, a system memory 906, and a bus 908 that couples various system components including system memory 906 to processor 904, cameras, HUD(s), sensors, and/or the like.

Bus 908 represents one or more of any of several types of bus structures, including a memory bus or memory controller, a peripheral bus, an accelerated graphics port, and a processor or local bus using any of a variety of bus architectures. Such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media.

System memory 906 may include computer system readable media in the form of volatile memory, such as random access memory (RAM) 910 and/or cache memory 912. Computer system/server 902 may further include other removable/non-removable, volatile/non-volatile computer system storage media. By way of example only, storage system 913 can be provided for reading from and writing to a non-removable, non-volatile magnetic media (not shown and typically called a "hard drive"). Although not shown, an optical disk drive for reading from or writing to a removable, non-volatile optical disk such as a CD-ROM, DVD-ROM or other optical media may be provided. In such instances, each can be connected to bus 908 by one or more data media interfaces. As will be further depicted and described below, memory 906 may include at least one program product having a set (e.g., at least one) of program modules that are configured to carry out the functions of embodiments of the invention.

Program/utility 914, having a set (at least one) of program modules 916, may be stored in memory 906, as well as an operating system, one or more application programs, other program modules, and program data. Each of the operating system, one or more application programs, other program modules, and program data or some combination thereof, may include an implementation of a networking environment. Program modules 916 generally carry out the functions and/or methodologies of embodiments of the invention as described herein.

Computer system/server 902 may also communicate with one or more external devices 918 such as a keyboard, a pointing device, a display 920, etc.; one or more devices that enable a user to interact with computer system/server 902; and/or any devices (e.g., network card, modem, etc.) that enable computer system/server 902 to communicate with one or more other computing devices. Such communication can occur via Input/Output (I/O) interfaces 922. Still yet, computer system/server 902 can communicate with one or more networks such as a local area network (LAN), a general wide area network (WAN), and/or a public network (e.g., the Internet) via network adapter 924. As depicted, network adapter 924 communicates with the other components of computer system/server 902 via bus 908. It should be understood that although not shown, other hardware and/or software components could be used in conjunction with computer system/server 902. Examples, include, but are not limited to: microcode, device drivers, redundant processing units, external disk drive arrays, RAID systems, tape drives, and data archival storage systems, etc.

The embodiments of the present disclosure described herein are implemented as logical steps in one or more computer systems. The logical operations of the present disclosure are implemented (1) as a sequence of processor-implemented steps executing in one or more computer systems and (2) as interconnected machine or circuit engines within one or more computer systems. The implementation is a matter of choice, dependent on the performance requirements of the computer system implementing aspects of the present disclosure. Accordingly, the logical operations making up the embodiments of the disclosure described herein are referred to variously as operations, steps, objects, or engines. Furthermore, it should be understood that logical operations may be performed in any order, unless explicitly claimed otherwise or a specific order is inherently necessitated by the claim language.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the disclosure and are thus within the spirit and scope of the present disclosure. From the above description and drawings, it will be understood by those of ordinary skill in the art that the particular embodiments shown and described are for purposes of illustrations only and are not intended to limit the scope of the present disclosure. References to details of particular embodiments are not intended to limit the scope of the disclosure.

OPERATION

The anti-sniper targeting and detection system operates by automatically detecting target(s), in advance, calculating the target positions relative to the system, computing the fire control arm angles based on aggregate sensor data and trajectory calculations, and rapidly moving the fire control arm to the target in an assigned shared priority sequence where targets may be viewed, assessed, verified as unfriendly, and fired upon in rapid succession. If the vehicle and targets are moving, the fire control arm and target data may be continually adjusted accordingly.

What is claimed is:

1. A system for detecting a target comprising:
   at least one computing device comprising at least one processor to:
   receive target data from an omni-directional stereoscopic device;
   identifying at least one movement of a potential target;
   determine a location of the potential target based on the target data, the location and range determined relative to the orientation of the computing device, thereby confirming the potential target as an actual target; and
   generate a target vector for the actual target based on the location, the target vector indicating a firing direction for firing a projectile at the actual target.

2. The system of claim 1, wherein the omni-directional stereoscopic device is a spherical camera and wherein the target data comprises audio identifying the at least one movement.

3. The system of claim 1, wherein the omni-directional stereoscopic device is a spherical camera and wherein the target data comprises at least two infrared images identifying the at least one movement.

4. The system of claim 3, wherein the location of the target is determine by triangulating the at least to infrared images of the target in real-time based on the orientation of the computing device and the potential target.

5. The system of claim 1, wherein the at least one processor is further configures to:
   receive at least one of wind speed data, wind direction data, temperature data, or pressure data;
   determine a wind speed and direction of the actual target based on the at least one of the wind speed data, the wind direction data, the temperature data, or the pressure data; and
   adjust the target vector according to the wind speed and direction.

6. The system of claim 1, wherein the at least one processor is further configured to display the target data in a three-dimensional stereographic space defining a point-of-view for a user from a perspective of the omni-directional stereographic device, the three-dimensional stereographic space corresponding to a real-world environment.

* * * * *